(12) United States Patent
Liang et al.

(10) Patent No.: US 8,762,710 B2
(45) Date of Patent: Jun. 24, 2014

(54) METHOD AND SYSTEM FOR UPDATING AND USING DIGITAL CERTIFICATES

(75) Inventors: Jiehui Liang, Shenzhen (CN); Yuanqing Shi, Shenzhen (CN); Wangxing Kang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 138 days.

(21) Appl. No.: 13/202,164

(22) PCT Filed: Aug. 20, 2009

(86) PCT No.: PCT/CN2009/073388
§ 371 (c)(1),
(2), (4) Date: Aug. 18, 2011

(87) PCT Pub. No.: WO2010/108347
PCT Pub. Date: Sep. 30, 2010

(65) Prior Publication Data
US 2011/0302411 A1   Dec. 8, 2011

(30) Foreign Application Priority Data
Mar. 23, 2009 (CN) .......................... 2009 1 0128495

(51) Int. Cl.
*H04L 29/06* (2006.01)
*H04W 12/06* (2009.01)
*H04W 88/08* (2009.01)

(52) U.S. Cl.
CPC ........... *H04L 63/0823* (2013.01); *H04W 12/06* (2013.01); *H04W 88/08* (2013.01)
USPC .......................................... 713/158; 713/156

(58) Field of Classification Search
CPC ... H04L 63/0823; H04W 12/06; H04W 88/08
USPC .................................. 713/156, 158
See application file for complete search history.

(56) References Cited

U.S. PATENT DOCUMENTS

| | | | | |
|---|---|---|---|---|
| 6,675,296 | B1* | 1/2004 | Boeyen et al. ................. | 713/156 |
| 2006/0075219 | A1 | 4/2006 | Callaghan et al. | |
| 2006/0174106 | A1* | 8/2006 | Bell et al. ...................... | 713/156 |
| 2007/0198831 | A1* | 8/2007 | Suzuki et al. ................. | 713/156 |
| 2010/0009656 | A1* | 1/2010 | Pang et al. .................... | 455/410 |

FOREIGN PATENT DOCUMENTS

| | | |
|---|---|---|
| CN | 1697370 | 11/2005 |
| CN | 1832395 | 9/2006 |
| CN | 101136743 | 3/2008 |

OTHER PUBLICATIONS

Rubia, M., Cruellas, J., & Medina, M. (1999). The DEDICA project: The solution to the interoperability problems between the X. 509 and EDIFACT Public Key Infrastructures. Secure Networking—CQRE [Secure]'99, 779-779.*

* cited by examiner

*Primary Examiner* — Vu Le
*Assistant Examiner* — Tracy Mangialaschi
(74) *Attorney, Agent, or Firm* — Drinker Biddle & Reath LLP

(57) ABSTRACT

A method and system for updating and using a digital certificate, and the method comprises: a first terminal establishing a secure link with an access point and using the secure link to send a certificate updating request to the access point, where the certificate updating request includes a digital certificate to be updated which is currently used by the first terminal; and the access point sending the digital certificate to be updated to a local Authentication Service Unit which issues the certificate to be updated; and the local Authentication Service Unit which issues the digital certificate to be updated verifying the digital certificate to be updated, and after the digital certificate is verified to be valid, a local Authentication Service Unit corresponding to the access point generating a new digital certificate of the first terminal and sending the new digital certificate to the first terminal through the access point.

15 Claims, 2 Drawing Sheets

METHOD AND SYSTEM FOR UPDATING AND USING DIGITAL CERTIFICATES

TECHNICAL FIELD

The present invention relates to the wireless local area network (WLAN) field, and particularly, to a method and system for updating and using a digital certificate of a wireless local area network device.

BACKGROUND OF THE RELATED ART

The security mechanism of the wireless local area network standard (IEEE 802.11) constituted by the Institute of Electrical and Electronics Engineers (IEEE) adopts the Wired Equivalent Privacy (WEP). At present, this mechanism has been widely proved that it does not have the security equivalent to the security of the wired, which brings serious potential danger to the wireless local area network. Therefore, in the constitution of the wireless area network national standard, the WLAN Authentication and Privacy Infrastructure (WAPI) is adopted to implement the security of the wireless local network. Through the method of the Elliptic curve Diffie-Hellman (ECDH) key exchange in the public key systematic, the WAPI mechanism implements authentication for a terminal digital certificate and an Access Point (AP) digital certificate and negotiation on a session key. The WAPI can guarantee the data transmission in security between a terminal and an AP in the data link layer, which prevents the malicious personnel attacking the security of the wireless local area network, such as the Man-In-The-Middle attacking, Replay attacking, and Impersonation attacking and so on.

The WAPI supports two formats of digital certificates (written as certificate for short hereinafter): the X.509v3 and GBW (national standard material) certificates. The format of a GBW certificate is as shown in FIG. 1, which is composed of fields information such as a version number, a serial number, an issuer name, a period of validity, a subject name, a subject public key, an extension, a signature algorithm, an issuer signature and so on, wherein the issuer name, extension, signature algorithm and issuer signature are optional information.

The format of an X.509v3 certificate is as shown in FIG. 2, which is composed of three parts: the content of the certificate, the signature algorithm and the signature value. Wherein the content of the certificate includes a version number, a serial number, an identifier of the signature algorithm, an issuer name, a period of validity, a subject name, subject public key information, a uniqueness identifier of the issuer, a uniqueness identifier of the subject and the extension information. The X.509v3 certificate is encoded by the Abstract Syntax Notation. 1 (ASN.1) distinguished encoding rules (DER), and each field information includes a triple including tag, length and value.

Although there are some same fields in the two certificate formats supported by the WAPI, such as field information of the version number, the serial number, the issuer name, the period of validity, the subject name, the subject public key, the signature algorithm and the issuer signature, the denotation methods of these two are different. These fields in GBW certificate are stored directly in the network byte order, while in X.509v3 certificate these fields are stored in a binary system using the ASN.1. Although the information content of some fields is the same, the methods to explain them are different. For example, the period of validity is denoted by seconds in the GBW, but it is denoted by a beginning date and expiration date in the X.509v3.

Since there are two certificate formats, different certificate validating ways are required. In the Ad hoc network mode (which is also called an Independent Basic Service Set (IBSS) mode), if the WAPI certificate security way is adopted, a terminal has to validate the certificate, but the national standard does not compulsively require the terminal to use a certain format of certificate, nor compulsively require the terminal to support validation of a certain format of certificate. Therefore, in the Ad hoc network mode, the WAPI frame adopting the certificate way certainly will bring the interoperability problem.

SUMMARY OF THE INVENTION

The technical problem to be solved by the present invention is to overcome the drawbacks in the prior art and provide a method for updating and using a digital certificate, which can enable a terminal to update a digital certificate.

To solve the above problem, the present invention provides a method for updating and using a digital certificate, and the method comprises:

a first terminal establishing a secure link with an access point;

the first terminal using the secure link to send a certificate updating request to the access point, where the certificate updating request includes a digital certificate to be updated which is currently used by the first terminal; and the access point sending the digital certificate to be updated to a local Authentication Service Unit which issues the certificate to be updated; and the local Authentication Service Unit which issues the digital certificate to be updated verifying the digital certificate to be updated, and after the digital certificate to be updated is verified to be valid, a local Authentication Service Unit corresponding to the access point generating a new digital certificate of the first terminal, and sending the new digital certificate to the first terminal through the access point.

Additionally, if the local Authentication Service Unit which issues said digital certificate to be updated and the local Authentication Service Unit corresponding to said access point are different local Authentication Service Units, said step of said access point sending said digital certificate to be updated to the local Authentication Service Unit which issues the certificate to be updated comprises:

said access point sending said certificate updating request which includes said digital certificate to be updated to the local Authentication Service Unit corresponding to said access point; and according to an issuer name field in said digital certificate to be updated, the local Authentication Service Unit corresponding to said access point sending a certificate signing and issuing policy obtaining request which includes said digital certificate to be updated to the local Authentication Service Unit which issues said digital certificate to be updated.

Additionally, the step of the local Authentication Service Unit corresponding to said access point generating a new digital certificate of said first terminal, and sending said new digital certificate to said first terminal through said access point comprises:

the local Authentication Service Unit which issues said digital certificate to be updated receiving said certificate signing and issuing policy obtaining request, revoking said digital certificate to be updated, and sending a certificate signing and issuing policy obtaining response to the local Authentication Service Unit corresponding to said access point to instruct the local Authentication Service Unit corresponding to said access point to generate said new digital certificate;

after generating said new digital certificate, the local Authentication Service Unit corresponding to said access point including said new digital certificate into a certificate updating response and sending the certificate updating response to said access point; and said access point using said secure link to send said new digital certificate to said first terminal.

Additionally, said certificate updating request further includes a digital certificate format identifier;

when said access point sends said digital certificate to be updated to the local Authentication Service Unit which issues the certificate to be updated, said access point also sends said digital certificate format identifier to the local Authentication Service Unit which issues the certificate to be updated;

said local Authentication Service Unit corresponding to said access point generates said new digital certificate in a format which corresponds to said digital certificate format identifier.

Additionally, before the step of a first terminal establishing a secure link with an access point, said method further comprises:

a second terminal sending a beacon probe frame to said first terminal, said beacon probe frame including digital certificate format information of said second terminal; and after receiving said beacon probe frame, said first terminal checking whether a digital certificate format of said second terminal is the same with a digital certificate format of said first terminal, if not, proceeding to the step of a first terminal establishing a secure link with an access point.

Additionally, said digital certificate format identifier is used for identifying the digital certificate format of said second terminal.

Additionally, said method further comprises:

after receiving said new digital certificate, said first terminal sending an authentication activating request to said second terminal, said authentication activating request including said new digital certificate;

after receiving said authentication activating request, said second terminal verifying said new digital certificate, and after said new digital certificate is verified to be valid, said second terminal opening a controlled port to allow receiving data streams from said first terminal, and sending an access authentication request to said first terminal, where said access authentication request includes a digital certificate of said second terminal; and after receiving said access authentication request, said first terminal verifying the digital certificate of said second terminal, and after the digital certificate of said second terminal is verified to be valid, said first terminal opening a controlled port to allow receiving data streams from said second terminal.

The present invention further provides a system for updating and using a digital certificate, and said system comprises: a first terminal, an access point, a local Authentication Service Unit corresponding to said access point and a local Authentication Service Unit which issues a digital certificate to be updated, wherein said local Authentication Service Unit corresponding to said access point and said local Authentication Service Unit which issues the digital certificate to be updated are the same local Authentication Service Unit or different local Authentication Service Units, said first terminal is configured to establish a secure link with the access point, use the established secure link to send a certificate updating request to said access point, wherein said certificate updating request includes the digital certificate to be updated which is currently used by said first terminal;

said access point is configured to send said digital certificate to be updated to the local Authentication Service Unit which issues the digital certificate to be updated;

said local Authentication Service Unit which issues said digital certificate to be updated is configured to verify said digital certificate to be updated;

said local Authentication Service Unit corresponding to said access point is configured to generate a new digital certificate of said first terminal, and send said new digital certificate to said first terminal through said access point.

Additionally, said certificate updating request further includes a digital certificate format identifier;

said access point is also configured to, when sending said digital certificate to be updated to the local Authentication Service Unit which issues the digital certificate to be updated, send said digital certificate format identifier to the local Authentication Service Unit which issues the digital certificate to be updated;

said local Authentication Service Unit corresponding to said access point generates the new digital certificate of said first terminal in a format which corresponds to said digital certificate format identifier.

Additionally, said system further comprises a second terminal, the second terminal is configured to send a beacon probe frame to said first terminal, where said beacon probe frame includes digital certificate format information of said second terminal;

said first terminal is also configured to receive said beacon probe frame, and check whether a digital certificate format of said second terminal is the same with a digital certificate format of said first terminal, if not, send a certificate updating request which includes a digital certificate format identifier;

said digital certificate format identifier is used for identifying the digital certificate format of said second terminal.

Additionally, said first terminal is also configured to send an authentication activating request to said second terminal after receiving the new digital certificate, where said authentication activating request includes said new digital certificate;

said second terminal is also configured to verify said new digital certificate after receiving the authentication activating request, and open a controlled port after the authentication passes to allow receiving data streams from said first terminal, and send an access authentication request to said first terminal, where said access authentication request includes a digital certificate of said second terminal;

said first terminal is also configured to verify the digital certificate of said second terminal after receiving the access authentication request, and open a controlled port after the authentication passes to allow receiving data streams from said second terminal.

In conclusion, the method and system in the present invention can implement update for a digital certificate, and particularly can transform the digital certificate formats. A terminal can establish the Ad hoc network communication with terminals which use different digital certificates by transforming the digital certificate formats, and the terminal does not need to support a plurality of digital certificate formats, which simplifies the design of the terminal and improves the interoperability between terminals.

PREFERRED EMBODIMENTS OF THE PRESENT INVENTION

Below it will briefly describe the system for updating and using a digital certificate according to the present invention at first. The functions of each network element in the system and the connection relationship between each network element (namely the messages interacting relationship) will be described further when the method for updating and using a digital certificate according to the present invention is described.

The system for updating and using the digital certificate according to the present invention includes: a first terminal (UE-A) and an access point (AP); and this system further includes: a local ASU which serves as an issuing authority of the digital certificate to be updated which is currently used by the first terminal, or an issuing authority (which is called an issuing ASU) including a local ASU and said issuing authority of the digital certificate to be updated;

Said first terminal is used for sending a certificate updating request to said AP using a secure link after said AP establishes the secure link, wherein said certificate updating request includes the digital certificate to be updated which is currently used by the first terminal;

Said AP is used for sending said digital certificate to be updated to said issuing authority;

Said issuing authority is used for automatically generating or instructing said local ASU to generate a new digital certificate of said first terminal after said digital certificate to be updated is validated successfully, and sending said new digital certificate to said first terminal through said AP.

Below it will describe the updating and using of the digital certificate according to the present invention with reference to the figures and examples in details.

Figure 1:
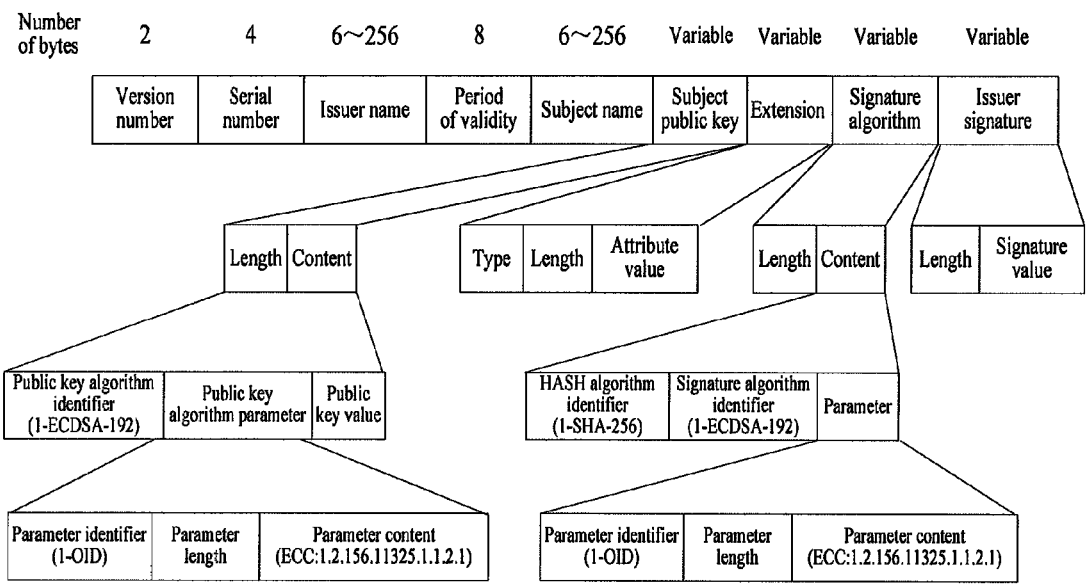
FIG. 1 is a schematic diagram of the format of the GWB certificate in the prior art.
Figure 2:
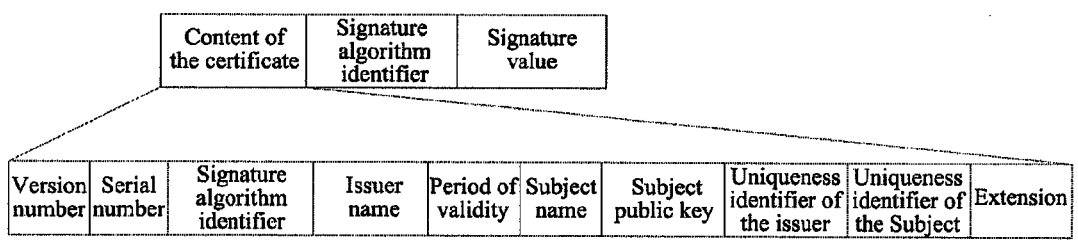
FIG. 2 is a schematic diagram of the format of the X.509v3 certificate in the prior art.
Figure 3:
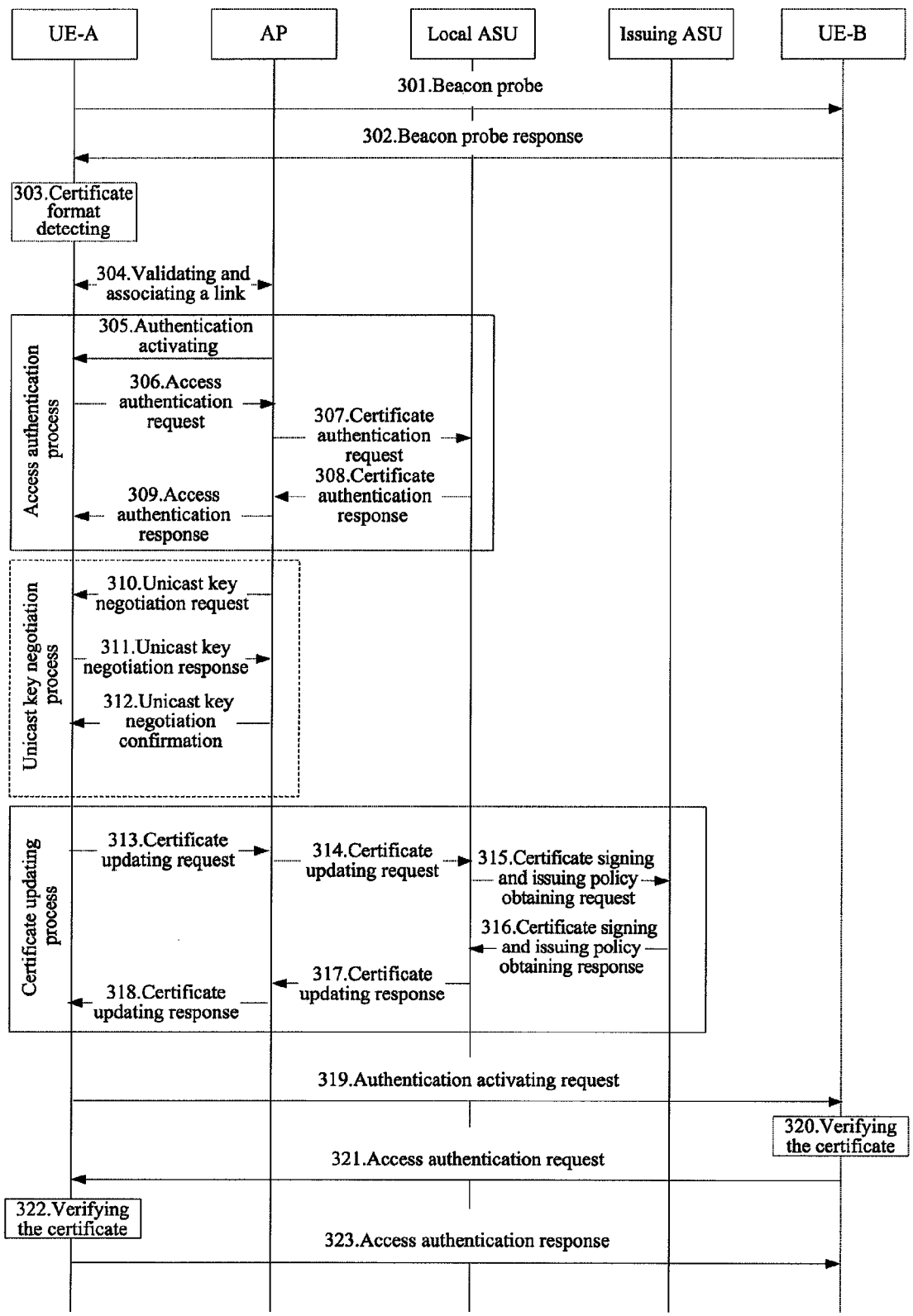
FIG. 3 is a flow chart of the method for transforming digital certificates (the method for updating and using a digital certificate) in the process of establishing the Ad hoc network communication according to an example of the present invention.

FIG. 3 is a flow chart of the method for transforming digital certificates (the method for updating and using digital certificates) in the process of establishing the Ad hoc network communication according to an example of the present invention. As shown in FIG. 3, in this example, when two terminals with the WAPI function (called UE-A and UE-B respectively) are to establish the Ad hoc network communication, where the certificate formats of these two terminals are different with one terminal adopting the national standard GBW format while the other terminal adopting the X.509v3 format, and one of the two terminals (UE-A in this example) can identify certificates of the two formats, then it requires to transform the certificate formats according to following steps before carrying out the WAPI Ad hoc network communication in the certificate way.

301: UE-A sends a beacon probe frame to UE-B to start a scanning procedure when the UE-A is to establish the Ad hoc network communication with UE-B.

302: after receiving the beacon probe frame, UE-B includes its own wireless channel information and WAPI security information into a beacon probe response frame and sends the beacon probe response frame to UE-A; wherein the WAPI security information includes the certificate format information of the UE-B.

303: after receiving the beacon probe response frame, UE-A detects that the certificate format of UE-B is different from that of UE-A itself, and UE-A cannot communicate with UE-B, so UE-A requires to communicate with the certificate issuing authority, namely, an Authentication Service Unit (ASU), so that the UE-A can transform the certificate format of UE-A itself into the required format, and updates the local certificate information.

304: UE-A validates a link with the local AP and associates with the local AP.

After finishing link validation and association with the local AP, UE-A will carry out an access authentication process (steps 305~309):

305: the AP sends an authentication activating request to UE-A to start the WAPI authentication process; and the above authentication activating request includes information such as: a certificate of the AP, ECDH parameters, a local ASU identifier and an authentication identifier, and so on.

306: after receiving the authentication activating primitive sent by the AP, UE-A sends an access authentication request to the AP; and the access authentication request includes information such as a certificate of UE-A, a certificate of AP, ECHD parameters and a temporary public key PX which is used for ECDH exchanging and so on.

307: after receiving the access authentication request sent by UE-A, AP sends a certificate authentication request to the local ASU; and the certificate authentication request includes information such as a certificate of the AP, a certificate of UE-A, and a random number generated by the AP and so on.

308: the local ASU verifies the certificate of UE-A and the certificate of the AP, and according to a verification result of the certificate of UE-A and the certificate of the AP, constructs a certificate authentication response, and adds correspondent signature in the certificate authentication response, and then sends the certificate authentication response to the AP.

309: the AP verifies the signature of the certificate authentication response returned from the local ASU to obtain a verification result of the terminal certificate, and if the terminal certificate is verified to be valid, the AP carries out the ECDH calculation using a temporary private key SY which is used for ECDH exchanging generated by the Ap and the temporary public key PX sent by UE-A to obtain a key seed, and uses this key seed to generate a basic key BK, and sends an access authentication response to UE-A; and the access authentication response includes information such as a temporary public key PY which is used for ECDH exchanging generated by the AP and a certificate verification result and so on.

After receiving the access authentication response, UE-A carries out the ECDH calculation using a temporary private key SX generated by itself and the temporary public key PY included in the access authentication response to obtain a key seed, and uses this key seed to generate a basic key BK.

It should be noted that the BK generated by the AP and the BK generated by UE-A are same according to the principle of the ECDH exchanging.

After finishing the access authentication process by interacting with the local AP and the local ASU, UE-A uses the basic key BK generated in the access authentication process to negotiate a unicast key (steps 310~312):

310: the AP generates a random number N1, adds N1 into a unicast key negotiation request and sends the request to UE-A.

311: after receiving the unicast key negotiation request, UE-A generates a random number N2, and then generates a unicast key USK using a HASH algorithm with a key taking N1 and N2 as parameters and BK as a key; and sends a unicast key negotiation response to the AP, where the unicast key negotiation response includes the random number N2.

312: after receiving the unicast key negotiation response, the AP generates a unicast key USK using the HASH algorithm with a key taking N1 and N2 as parameters and BK as a key, and sends a unicast key negotiation confirmation to UE-A to finish the unicast key negotiation process.

Henceforth, the AP and UE-A can use the above unicast key to perform encryption and decryption in the link layer, and the process of transforming certificates is carried out in a secure link (steps 313~318):

313: UE-A uses the secure link between UE-A and the AP to send a certificate updating request to the AP, and this certificate updating request includes information such as a certificate which is being used by UE-A currently (the old certificate), the certificate format into which the certification currently used by UE-A is to be transformed (short for target format) and so on.

314: after receiving the certificate updating request of UE-A, the AP forwards it to the local ASU.

315: after receiving the certificate updating request, the local ASU extracts the certificate content, and according to the field of the issuer name in the certificate content, sends a certificate signing and issuing policy obtaining request to the ASU which issues this certificate (referred to as issuing ASU for short); and this request includes the certificate of UE-A.

316: the original certificate issuing authority verifies the validity and integrality of the certificate of UE-A, and revokes the original certificate after confirming its legality and validity, and sends a certificate signing and issuing policy obtaining response to the local ASU to instruct the local ASU to serve as a new certificate issuing authority to re-issue a certificate in a special format according the requirements of UE-A.

317: after the local ASU receiving the certificate signing and issuing policy obtaining response, if the issuing ASU allows the local ASU to serve as a new issuing authority, according to the user's requirements, the local ASU extracts information in each field of the original certificate, generate each field of a new certificate, and signs and generates the new certificate, and then sends the new certificate to the AP by a certificate updating response.

318: the AP sends the certificate updating response to UE-A.

So far, the process of transforming certificates of UE-A is finished, and the original certificate is revoked. The subsequent communication process can use the new certificate.

319: UE-A sends an authentication activating request to start the WAPI authentication process with another terminal UE-B; and the authentication activating request includes the new certificate of UE-A.

320: after receiving the authentication activating request sent by UE-A, UE-B verifies the new certificate of UE-A.

321: if the certificate is verified to be valid, UE-B opens a controlled port to allow receiving data streams from UE-A, and sends an access authentication request to UE-A, where the access authentication request includes the certificate of UE-B.

322: after receiving the access authentication request, UE-A verifies the certificate of UE-B.

323: if the certificate is verified to be valid, UE-A opens a controlled port to allow receive data streams from UE-B, and sends an access authentication response to UE-B.

So far, UE-A and UE-B accomplish the bi-directional authentication process, both sides can carry out a round of key negotiation process over again, and securely transfer data traffic therebetween.

According to the basic principle of the present invention, above examples can have various transformations, such as:

(1) if the local ASU is the issuing authority of the certificate which is used by UE-A currently, steps 315~316 can be omitted, and the local ASU directly carries out the process of updating a certificate and revoking an original certificate.

(2) in step 316, the issuing authority of the certificate used by UE-A currently can carry out updating a certificate by itself, and includes the new certificate into the certificate signing and issuing policy obtaining response and sends the response to the local ASU, and the local ASU sends the new certificate to UE-A through the AP.

(3) besides the above certificate updating process, a terminal can also establish a secure link with the AP with the current certificate before this certificate expires, and then uses this secure link to originate a certificate updating request to apply for a new certificate from the issuing authority ASU, thereby implementing the transformation of certificate formats.

(4) besides using the certificate based access authentication process described in steps 305~309 and the unicast key negotiation process described in steps 310~312, the terminal also can establish a secure link according to the WAPI standard based on the pre-shared key.

INDUSTRIAL APPLICABILITY

The method and system in the present invention can implement update for a digital certificate, and particularly can transform the digital certificate formats. A terminal can establish the Ad hoc network communication with terminals which use different digital certificates by transforming the digital certificate formats, and the terminal does not need to support a plurality of digital certificate formats, which simplifies the design of the terminal and improves the interoperability between terminals.

What we claim is:

1. A method for updating and using a digital certificate in establishing an ad hoc network communication between two terminals, the method comprising:

a first terminal having a wireless local area network (WLAN) Authentication and Privacy Infrastructure (WAPI) function sending a beacon probe frame to a second terminal having said WAPI function;

after receiving said beacon probe frame from said first terminal, said second terminal sending a beacon probe response frame including digital certificate format information of said second terminal to said first terminal;

after receiving said beacon probe response frame, said first terminal checking whether a digital certificate format of said second terminal is different from a digital certificate format of said first terminal;

after said first terminal checking confirms that said digital certificate format of said second terminal is different from said digital certificate format of said first terminal, said first terminal establishing a secure link with an access point; and said first terminal using said secure link to send a certificate updating request to said access point, where said certificate updating request includes a digital certificate to be updated which is currently used by said first terminal and said digital certificate format information of said second terminal;

said access point sending said digital certificate to be updated to a local Authentication Service Unit which issues the certificate to be updated;

the local Authentication Service Unit which issues said digital certificate to be updated verifying said digital certificate to be updated, and after said digital certificate is verified to be valid, a local Authentication Service Unit corresponding to said access point generating a new digital certificate of said first terminal, and sending said new digital certificate to said first terminal through said access point so that a digital certificate format of said new digital certificate of said first terminal matches said digital certificate format of said second terminal; and after receiving said new digital certificate, said first terminal performing WAPI ad hoc network communication with said second terminal by using said new digital certificate.

2. The method as claimed in claim 1, wherein if the local Authentication Service Unit which issues said digital certificate to be updated and the local Authentication Service Unit corresponding to said access point are different local Authentication Service Units, said step of said access point sending said digital certificate to be updated to the local Authentication Service Unit which issues said certificate to be updated comprises:

said access point sending said certificate updating request which includes said digital certificate to be updated to the local Authentication Service Unit corresponding to said access point; and according to an issuer name field in said digital certificate to be updated, the local Authentication Service Unit corresponding to said access point sending a certificate signing and issuing policy obtaining request which includes said digital certificate to be updated to the local Authentication Service Unit which issues said digital certificate to be updated.

3. The method as claimed in claim 2, wherein the step of the local Authentication Service Unit corresponding to said access point generating said new digital certificate of said first terminal, and sending said new digital certificate to said first terminal through said access point comprises:

the local Authentication Service Unit which issues said digital certificate to be updated receiving said certificate signing and issuing policy obtaining request, revoking said digital certificate to be updated, and sending a certificate signing and issuing policy obtaining response to the local Authentication Service Unit corresponding to said access point to instruct the local Authentication Service Unit corresponding to said access point to generate said new digital certificate;

after generating said new digital certificate, the local Authentication Service Unit corresponding to said access point including said new digital certificate into a certificate updating response and sending said certificate updating response to said access point; and said access point using said secure link to send said new digital certificate to said first terminal.

4. The method as claimed in claim 1, wherein said certificate updating request further includes a digital certificate format identifier;

when said access point sends said digital certificate to be updated to the local Authentication Service Unit which issues said certificate to be updated, said access point also sends said digital certificate format identifier to the local Authentication Service Unit which issues said certificate to be updated;

the local Authentication Service Unit corresponding to said access point generates said new digital certificate in a format which corresponds to said digital certificate format identifier.

5. The method as claimed in claim 4, wherein said digital certificate format identifier is used for identifying said digital certificate format of said second terminal.

6. The method as claimed in claim 1, wherein the step of said first terminal performing said WAPI ad hoc network communication with said second terminal by using said new digital certificate comprises:

after receiving said new digital certificate, said first terminal sending an authentication activating request to said second terminal, said authentication activating request including said new digital certificate;

after receiving said authentication activating request, said second terminal verifying said new digital certificate, and after said new digital certificate is verified to be valid, said second terminal opening a controlled port to allow receiving data streams from said first terminal, and sending an access authentication request to said first terminal, where said access authentication request includes a digital certificate of said second terminal; and after receiving said access authentication request, said first terminal, verifying said digital certificate of said second terminal, and after said digital certificate of said second terminal is verified to be valid, said first terminal opening a controlled port to allow receiving data streams from said second terminal.

7. The method as claimed in claim 2, wherein said certificate updating request further includes a digital certificate format identifier;

when said access point sends said digital certificate to be updated to the local Authentication Service Unit which issues said certificate to be updated, said access point also sends said digital certificate format identifier to the local Authentication Service Unit which issues said certificate to be updated;

the local Authentication Service Unit corresponding to said access point generates said new digital certificate in a format which corresponds to said digital certificate format identifier.

8. The method as claimed in claim 3, wherein said certificate updating request further includes a digital certificate format identifier;

when said access point sends said digital certificate to be updated to the local Authentication Service Unit which issues said certificate to be updated, said access point also sends said digital certificate format identifier to the local Authentication Service Unit which issues said certificate to be updated;

the local Authentication Service Unit corresponding to said access point generates said new digital certificate in a format which corresponds to said digital certificate format identifier.

9. The method as claimed in claim 7, wherein said digital certificate format identifier is used for identifying said digital certificate format of said second terminal.

10. The method as claimed in claim 8, wherein said digital certificate format identifier is used for identifying said digital certificate format of said second terminal.

11. The method as claimed in claim 9, wherein the step of said first terminal performing said WAPI ad hoc network communication with said second terminal by using said new digital certificate comprises:

after receiving said new digital certificate, said first terminal sending an authentication activating request to said second terminal, said authentication activating request including said new digital certificate;

after receiving said authentication activating request, said second terminal verifying said new digital certificate, and after said new digital certificate is verified to be valid, said second terminal opening a controlled port to allow receiving data streams from said first terminal, and sending an access authentication request to said first terminal, where said access authentication request includes a digital certificate of said second terminal; and after receiving said access authentication request, said first terminal verifying said digital certificate of said second terminal, and after said digital certificate of said second terminal is verified to be valid, said first terminal opening a controlled port to allow receiving data streams from said second terminal.

12. The method as claimed in claim 10, wherein the step of said first terminal performing said WAPI ad hoc network communication with said second terminal by using said new digital certificate comprises:

after receiving said new digital certificate, said first terminal sending an authentication activating request to said second terminal, said authentication activating request including said new digital certificate;

after receiving said authentication activating request, said second terminal verifying said new digital certificate, and after said new digital certificate is verified to be valid, said second terminal opening a controlled port to allow receiving data streams from said first terminal, and sending an access authentication request to said first terminal, where said access authentication request includes a digital certificate of said second terminal; and after receiving said access authentication request, said first terminal verifying the digital certificate of said second terminal, and after said digital certificate of said second terminal is verified to be valid, said first terminal opening a controlled port to allow receiving data streams from said second terminal.

13. A system for updating and using a digital certificate in establishing an ad hoc network communication between two terminals, said system comprising:

a first terminal having a wireless local area network (WLAN) Authentication and Privacy Infrastructure (WAPI) function, a second terminal having said WAPI function, an access point, a local Authentication Service Unit corresponding to said access point and a local Authentication Service Unit which issues a digital certificate to be updated, wherein the local Authentication Service Unit corresponding to said access point and the local Authentication Service Unit which issues said digital certificate to be updated are the same local Authentication Service Unit or different local Authentication Service Units, said first terminal is configured to send a beacon probe frame to said second terminal, and after receiving a beacon probe response frame from said second terminal, check whether a digital certificate format of said second terminal is different from a digital certificate format of said first terminal, after the checking by said first terminal confirms that said digital certificate format of said second terminal is different from said digital certificate format of said first terminal, establish a secure link with said access point, use said established secure link to send a certificate updating request to said access point, wherein said certificate updating request includes said digital certificate to be updated which is currently used by said first terminal and digital certificate format information of said second terminal, and after receiving a new digital certificate sent by the local Authentication Service Unit corresponding to said access point through said access point, perform WAPI ad hoc network communication with said second terminal by using said new digital certificate;

said second terminal is configured to, after receiving said beacon probe frame from said first terminal, send said beacon probe response frame including said digital certificate format information of said second terminal to said first terminal;

said access point is configured to send said digital certificate to be updated to the local Authentication Service Unit which issues said digital certificate to be updated;

the local Authentication Service Unit which issues said digital certificate to be updated is configured to verify said digital certificate to be updated;

the local Authentication Service Unit corresponding to said access point is configured to generate said new digital certificate of said first terminal, and send said new digital certificate to said first terminal through said access point so that a digital certificate format of the new digital certificate of said first terminal matches said digital certificate format of said second terminal.

14. The system as claimed in claim 13, wherein said certificate updating request further includes a digital certificate format identifier;

said access point is also configured to, when sending said digital certificate to be updated to the local Authentication Service Unit which issues said digital certificate to be updated, send said digital certificate format identifier to the local Authentication Service Unit which issues said digital certificate to be updated;

the local Authentication Service Unit corresponding to said access point generates said new digital certificate of said first terminal in a format which corresponds to said digital certificate format identifier.

15. The system as claimed in claim 13, wherein said first terminal is also configured to send an authentication activating request to said second terminal after receiving said new digital certificate, where said authentication activating request includes said new digital certificate;

said second terminal is also configured to verify said new digital certificate after receiving said authentication activating request, and open a controlled port after said new digital certificate is verified to be valid to allow receiving data streams from said first terminal, and send an access authentication request to said first terminal, where said access authentication request includes a digital certificate of said second terminal;

said first terminal is also configured to verify said digital certificate of said second terminal after receiving said access authentication request, and open a controlled port after said digital certificate of said second terminal is verified to be valid to allow receiving data streams from said second terminal.

* * * * *